United States Patent [19]
Bronicki et al.

[11] Patent Number: 5,582,011
[45] Date of Patent: Dec. 10, 1996

[54] METHOD OF AND APPARATUS FOR GENERATING POWER FROM GEOTHERMAL FLUID CONTAINING A RELATIVELY HIGH CONCENTRATION OF NON-CONDENSABLE GASES

[75] Inventors: Lucien Y. Bronicki; Dan Batsha, both of Yavne, Israel

[73] Assignee: Ormat Industries Ltd., Yavne, Israel

[21] Appl. No.: 433,565

[22] Filed: May 3, 1995

[51] Int. Cl.$^6$ ............................................. F03G 4/06
[52] U.S. Cl. ........................... 60/641.5; 60/652; 60/655
[58] Field of Search .............................. 60/641.2, 652, 60/655, 641.5

[56] References Cited

U.S. PATENT DOCUMENTS

| | | | |
|---|---|---|---|
| 4,417,446 | 11/1983 | Nakamoto et al. | 60/655 |
| 4,542,625 | 9/1985 | Bronicki | 60/641.2 |
| 5,038,567 | 8/1991 | Moritz | 60/641.2 |

*Primary Examiner*—Denise L. Gromada
*Assistant Examiner*—Alfred Basichas
*Attorney, Agent, or Firm*—Donald M. Sandler

[57] ABSTRACT

A power plant operating on geothermal steam containing more than about 5% non-condensable gases includes a topping steam turbine for expanding the steam to produce power and from which exhaust steam is extracted at a pressure above atmospheric pressure, and an indirect contact heat exchanger containing clean water for condensing the exhaust steam at a pressure above atmospheric pressure to produce geothermal steam condensate, and for consequently vaporizing the clean water to produce clean steam. The non-condensable gases contained in the geothermal steam are extracted from the heat exchanger and, being at a pressure above atmospheric pressure, can be injected, without being further pressurized, directly into the ground. The clean steam produced by the heat exchanger is applied to a bottoming steam turbine which expands the clean steam to produce power and from which clean exhaust steam is extracted. A condenser operating at sub-atmospheric pressure condenses the clean steam to produce clean condensate which is returned to the heat exchanger by a cycle pump.

17 Claims, 1 Drawing Sheet

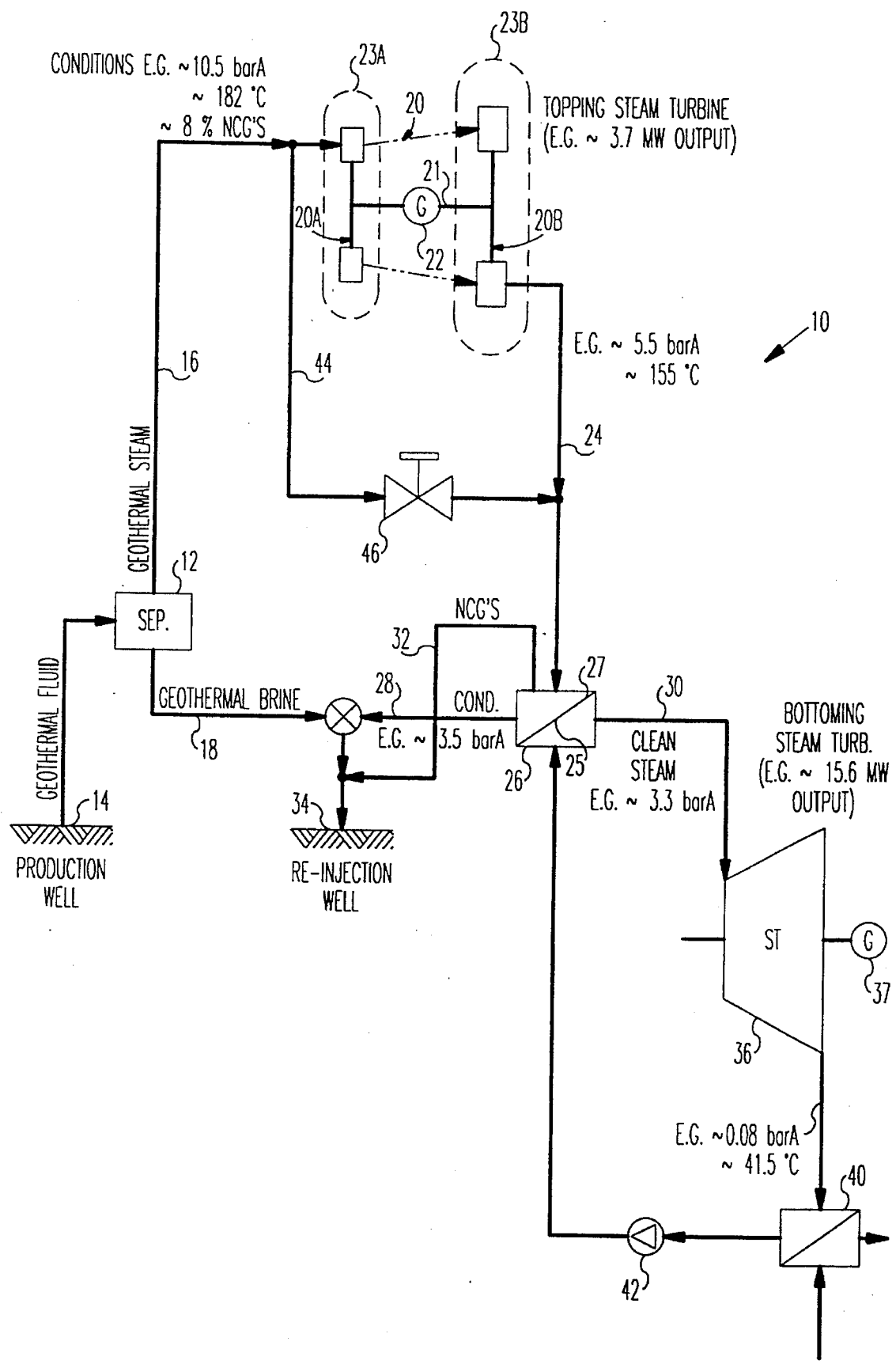

METHOD OF AND APPARATUS FOR GENERATING POWER FROM GEOTHERMAL FLUID CONTAINING A RELATIVELY HIGH CONCENTRATION OF NON-CONDENSABLE GASES

DESCRIPTION

1. Technical Field

This invention relates to a method of and apparatus for generating power from geothermal fluid containing a high concentration (i.e., >about 5%) of non-condensable gases (NCG'S).

2. Background Art

Geothermal sources adequate for power production have been discovered recently where the geothermal fluid contains high levels of NCG's. NCG's, particularly at high levels, adversely affect the thermal efficiency of heat exchangers by which heat in the geothermal fluid is transferred to another fluid such as air or water in a condenser, for example, or to a working fluid such as water, or an organic fluid (e.g., iso-pentane) in a vaporizer. When a condenser is involved, the presence of NCG's on the geothermal fluid side makes it difficult to achieve very low condensing temperatures on the water side of the condenser thus limiting the power level of a steam turbine. As a result, it is conventional to extract NCG's from the condenser associated with a steam turbine that operates on geothermal steam containing the gases, and to inject the extracted gases, if preferred, or if necessary, into the ground using a re-injection well. This technique reduces the size of the heat exchangers, and hence the capital cost of a power plant, and results in a smaller, more compact, and more efficient plant In any case where the steam turbine operates with a condenser whose temperature is such that the condenser pressure is considerably below atmospheric pressure in order to maximize the pressure ratio across the turbine and thus maximize the work produced, the NCG's extracted from the condenser also will be below atmospheric pressure. In order to extract such gases from the condenser, they must be pressurized; and when the level of NCG's in the geothermal steam is high, a considerable loss in power produced by the power plant is incurred by reason of the work required to pressurize the large quantities of these gases.

Quite apart from the specific problems associated discussed above with a geothermal installation producing steam with a high level of NCG's, is the aging of the geothermal field. Such aging usually results in volumetric variations in flow rate accompanied by decreases in temperature and pressure of the geothermal fluid. A geothermal power plant built to a given set of design conditions becomes less efficient as the parameters of the geothermal fluid shift from the design point, and power production slips with time.

The conventional solution to this problem is to drill additional production wells and attempt to maintain design conditions. While this approach is often feasible, it is sometimes impractical in some fields; and it is very difficult to predict during initial development of a field whether the aging process of the field can be accommodated. In such cases, an undesirable element of risk becomes associated with the large capital investments necessary to develop geothermal fields.

It is therefore an object of the present invention to provide a new and improved method of and apparatus for generating power from geothermal fluid containing large levels of NCG's which reduce, or substantially overcome, the problems outlined above.

DISCLOSURE OF INVENTION

A power plant according to the present invention operating on geothermal steam containing more than about 5% non-condensable gases comprises a topping steam turbine for expanding the steam to produce power, and to produce exhaust steam at a pressure above atmospheric pressure, and an indirect contact heat exchanger containing clean water for condensing the exhaust steam at a pressure above atmospheric pressure to produce geothermal steam condensate, and for consequently vaporizing the clean water to produce clean steam. The non-condensable gases contained in the geothermal steam are extracted from the heat exchanger. Both these gases and the geothermal steam, are at a pressure above atmospheric pressure, and consequently, without further pressurization, both can be injected directly into the ground, or can be vented to the atmosphere, or can be treated or dealt with by other means.

The clean steam produced by the heat exchanger is applied to a bottoming steam turbine which expands the clean steam to produce power and clean exhaust steam. A condenser operating at sub-atmospheric pressure condenses the clean steam to produce clean condensate which is returned to the heat exchanger by a cycle pump.

The provision of a topping steam turbine permits initial conversion of only a fraction (e.g., about 25%) of the total power available in the geothermal steam and achieves a dual purpose. First, the NCG's can be extracted at above atmospheric pressure so that extraction can occur without the expenditure of power for pressurization of these gases. Second, the bottoming or condensing turbine can be designed as efficiently as possible to produce, over a long period of time, a large portion (e.g., 75%) of the total power available in the initial geothermal steam obtained from the field. Because the topping turbine can be modified in the field relatively easily by altering its stages to accommodate variations in steam conditions, the condensing turbine can be isolated from variations in flow and conditions of the geothermal steam. Furthermore, by using in the bottoming turbine clean steam which does not contain any NCG's, the power required for maintaining the sub-atmospheric pressure in the condenser of this turbine is substantially reduced, and from a practical standpoint is negligible.

BRIEF DESCRIPTION OF THE DRAWINGS

A power plant according to an embodiment of the present invention is described by way of example with reference to the single figure of accompanying drawing.

DETAILED DESCRIPTION

Referring now to the drawing, reference numeral 10 designates a power plant according to the present invention. Power plant 10 includes means in the form of separator 12 responsive to geothermal fluid derived from production well 14 for producing geothermal steam. However, it should be understood that the present invention is applicable to power plants even if a separator is not utilized.

Separator 12 separates the geothermal fluid into vapor stream 16 containing geothermal steam and NCG's, and liquid stream 18 containing geothermal brine. Power plant 10 also includes topping steam turbine 20 coupled to generator 22 for expanding the geothermal steam to produce power and from which exhaust steam is extracted in exhaust line 24 at a pressure above atmospheric pressure.

The exhaust steam is applied to indirect contact heat exchanger 26 containing clean water and is condensed to geothermal steam condensate which exits in line 28 as the clean water is vaporized to produce clean steam in line 30 at a pressure greater than atmospheric pressure. The pressure ratio across turbine 20 is preferably about 2:1 with the result that under normal circumstances, the pressure on the steam side 27 of heat exchanger 26 will be above atmospheric pressure. For example, if the geothermal steam in vapor stream 16 has a temperature of about 182° C. and a pressure of about 10.5 barA, turbine 20 is effective to produce exhaust steam at a temperature of about 155° C. and a pressure of about 5.5 barA. The pressure of the clean steam, in such case, will be about 3.3 barA.

Line 32 connected to the geothermal steam side of heat exchanger 26 constitutes means for extracting NCG's contained in the exhaust steam from the heat exchanger. The pressure on the steam side of the heat exchanger preferably is significantly above atmospheric pressure, e.g., about 3.5 barA, and is sufficient to effect self-extraction of the NCG's, as well as the geothermal steam condensate from the heat exchanger. If preferred, the NCG's and the geothermal steam condensate can be injected without additional pressurization into re-injection well 34.

Plant 10 further includes bottoming steam turbine 36 coupled to generator 37 for expanding the clean steam in line 30 to produce power and clean exhaust steam which exits this turbine in exhaust line 38. Condenser 40, which can operate with either water or air coolant, condenses the clean exhaust steam to produce clean condensate. Condenser 40 operates at sub-atmospheric pressure permitting turbine 36 to extract a maximum amount of energy from the clean steam. As an example, the pressure in condenser 40 may be about 0.08 barA, and the temperature may be about 41.5° C. Finally, cycle pump 42 returns the clean condensate to the water side 25 of heat exchanger 26 to complete the clean water loop.

Preferably, the bottoming turbine will produce about 75% of the total power produced by the power plant, and will be designed on the basis of steam conditions produced by heat exchanger 26. Over time, as the geothermal field ages, the condition of the geothermal steam changes; and the changes normally would be reflected in changes in the steam conditions in line 30. In order to isolate turbine 36 from changes in the conditions of the geothermal steam, two techniques are used in the present invention. First, by-pass line 44 is provided; and second, topping turbine 20 is constructed in a manner that facilitates its modification.

By-pass line 44, which shunts turbine 20, includes control valve 46 for selectively applying geothermal steam in line 16 directly to heat exchanger 26. When valve 46 is fully opened, turbine 20 can be deprived completely of geothermal steam permitting this turbine to be taken off-line, e.g., for maintenance, etc. without interrupting the operation of the power plant whose total power will be reduced by only the contribution of the topping turbine, the output of which, in accordance with the present invention, is relatively small. Furthermore, if needed, bypass 44 can be used in parallel with topping turbine 20 during start-up or shut down, for example, to supply a portion of the geothermal fluid directly to the steam side of heat exchanger 26.

The construction of topping turbine 20 also contributes to the isolation of bottoming turbine 36 from variations in conditions of geothermal steam in line 16. Preferably, turbine 20 is a multi-stage turbine shown in the drawings as having high pressure stage or stages 20A and low pressure stage or stages 20B interconnected by shaft 21 supported by a pair of bearings. Generator 22 is interposed or located between the stages 20A and 20B; and is mounted directly on shaft 21. Housings 23A and 23B enclose the respective high and low pressure stages. Preferably, the rotational speed of the turbine stages is the same as the rotational speed of the electric generator and preferably, is relatively low at about 1500 RPM or 1800 RPM depending upon the frequency of the electrical load into which the generator feeds. Alternatively, under suitable conditions, stages 20A and 20B of topping turbine 20 can be parallel stages wherein the geothermal steam in line 16 is applied in parallel to stages 20A and 20B.

The turbine, preferably having no more than about two or three high pressure stages, and no more than about two or three low pressure stages, is designed so that the stages can be altered or replaced relatively easily and rapidly, such that efficient use can be made of the geothermal steam when its conditions change as a result of the aging of the geothermal field. In this manner, the efficiency of the topping turbine can be maintained in the presence of changing inlet conditions, and the nature of the steam exhausted by this turbine can be made to maintain the clean steam conditions in line 30 substantially constant in the face of changing conditions of the geothermal steam.

Finally, geothermal brine in line 18 produced by separator 12 can be disposed of in re-injection well 34 either separately or after being combined with the NCG's from heat exchanger 26 as shown in the drawing.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. A method for generating power from geothermal steam containing more than about 5% non-condensable gases, said method comprising:

a) expanding said geothermal steam to produce power and from which exhaust steam is extracted at a pressure above atmospheric pressure;

b) indirectly contacting said exhaust steam with clean water for condensing said exhaust steam at a pressure above atmospheric pressure to produce geothermal steam condensate, and for vaporizing said clean water to produce clean steam;

c) extracting from said heat exchanger, non-condensable gases contained in said geothermal steam;

d) expanding said clean steam to produce power and clean exhaust steam;

e) condensing said clean exhaust steam at sub-atmospheric pressure to produce clean condensate; and f) returning said clean condensate to said heat exchanger.

2. A method according to claim 1 wherein the ratio of power produced by expanding said geothermal steam to produce power and exhaust steam at a pressure above atmospheric pressure to power produced by expanding said clean steam to produce power and clean exhaust steam at sub-atmospheric pressure is about 1:3.

3. A method according to claim 2 wherein the amount of power produced by expanding said geothermal steam is changed in accordance with changes in the thermodynamic quality of the geothermal steam.

4. A method for producing power from geothermal steam having a steam component and a large amount of non-condensable gases comprising:

a) expanding the geothermal steam in a topping steam turbine for producing power and expanded geothermal steam at a pressure above atmospheric pressure;

b) condensing the expanded geothermal steam in an indirect contact heat exchanger to produce geothermal condensate and clean steam;

c) extracting non-condensable gases from the indirect contact heat exchanger;

d) expanding the clean steam in a bottoming steam turbine for producing power and expanded clean steam at a pressure below atmospheric pressure;

e) condensing said expanded clean steam for producing clean steam condensate; and f) returning said clean steam condensate to said indirect contact heat exchanger.

5. A power plant operating on geothermal fluid containing more than about 5% non-condensable gases, said power plant comprising:

a) means for producing geothermal steam from said geothermal fluid;

b) a topping steam turbine for expanding said geothermal steam to produce power and from which exhaust steam is extracted at a pressure above atmospheric pressure;

c) an indirect contact heat exchanger containing clean water for condensing said exhaust steam to produce geothermal steam condensate, and for vaporizing said clean water to produce clean steam;

d) means for extracting from said heat exchanger, non-condensable gases contained in said exhaust steam;

e) a bottoming steam turbine for expanding said clean steam to produce power and from which clean exhaust steam is extracted;

f) a condenser operating at a pressure below atmospheric pressure for condensing said clean steam to produce clean condensate; and g) a pump for returning said clean condensate to said heat exchanger.

6. A power plant according to claim 5 including means for conveying non-condensable gases extracted from said heat exchanger to a re-injection well.

7. A power plant according to claim 5 wherein the ratio of power produced by said topping steam turbine to power produced by said bottoming steam turbine is about 1:4.

8. A power plant according to claim 5 including a by-pass line shunting said topping steam turbine, said by-pass line including an on/off valve for selectively applying said geothermal steam directly to said indirect contact heat exchanger thus by-passing said topping turbine.

9. A power plant according to claim 5 including a separator responsive to said geothermal fluid for separating said geothermal fluid into a vapor stream containing geothermal steam and NCG's, and a liquid stream containing geothermal brine.

10. A power plant according to claim 9 wherein said geothermal brine is disposed of in a re-injection well.

11. A power plant according to claim 5 wherein the pressure ration across the bottoming steam turbine is greater than the pressure ratio across the topping steam turbine.

12. A power plant according to claim 11 wherein the pressure ratio across the topping steam turbine is about 2:1.

13. A power plant according to claim 12 wherein the pressure of said geothermal steam supplied to said topping turbine is about 10.5 barA.

14. A power plant according to claim 1 wherein said topping steam turbine is a multi-stage turbine having one or more high-pressure stages and one or more low-pressure stages mounted on a shaft, and an electrical generator mounted on said shaft between said one or more high-pressure stages and one or more low-pressure stages for rotation at the same speed as the stages of the turbine.

15. A power plant according to claim 14 having no more than three high-pressure stages, and no more than three low-pressure stages, and the number of low pressure stages is no more than three.

16. A power plant according to claim 14 wherein the rotational speed of said shaft is about 1500 RPM.

17. A power plant according to claim 14 wherein the rotational speed of said shaft is about 1800 RPM.

* * * * *